United States Patent [19]

Verduyn et al.

[11] Patent Number: 4,666,470

[45] Date of Patent: May 19, 1987

[54] PROCESS FOR CONDITIONING A GAS STREAM CHARGED WITH SOLID PARTICLES AND/OR VAPORS

[75] Inventors: Hendrik A. Verduyn, Krimpen a/d IJssel; Arie Griffioen, Amersfoort, both of Netherlands

[73] Assignee: Seac International B. V., Netherlands

[21] Appl. No.: 787,696

[22] Filed: Oct. 15, 1985

Related U.S. Application Data

[63] Continuation of Ser. No. 664,023, Oct. 23, 1984, abandoned, which is a continuation of Ser. No. 526,281, Aug. 25, 1983, abandoned.

[30] Foreign Application Priority Data

Sep. 3, 1982 [NL] Netherlands ................. 8203455

[51] Int. Cl.$^4$ .............................................. B01D 47/06
[52] U.S. Cl. ............................................. 55/20; 55/84; 55/217
[58] Field of Search ................. 55/20, 84, 225, 226, 55/217, 270, DIG. 34

[56] References Cited

U.S. PATENT DOCUMENTS

| | | | |
|---|---|---|---|
| 3,385,030 | 5/1968 | Letvin | 55/257 MP |
| 3,431,707 | 3/1969 | Berg | 55/20 |
| 3,518,812 | 7/1970 | Kolm | 55/20 |
| 3,782,074 | 1/1974 | Gardenier | 55/20 |
| 3,920,774 | 11/1975 | Reigel et al. | 261/17 |
| 4,208,383 | 6/1980 | Kisters et al. | 423/215.5 |
| 4,229,411 | 10/1980 | Kisters et al. | 422/62 |

FOREIGN PATENT DOCUMENTS

2159186 11/1971 Fed. Rep. of Germany .
7821425 7/1978 France .
7907795 10/1979 Netherlands .

OTHER PUBLICATIONS

Pony et al., "*Chemical Engineer's Handbook*" 4th ed., 1963, p. 22–37.
Langley, "*Refrigeration and Air Conditioning*", Reston Publishing Company, Inc., Reston, Virginia, 1978, pp. 542–547.
Muir, "Improved Cooling System Realizes Savings", *Plant Management & Engineering*, Mar. 1973.
Ashrae, "Ashrae Brochure on Psychrometry", American Society of Heating, Refrigerating and Air-Conditioning Engineers, Inc., New York, New York, pp. 30, 31, 66, 67.

*Primary Examiner*—Charles Hart
*Attorney, Agent, or Firm*—Bernard, Rothwell & Brown

[57] ABSTRACT

A process for conditioning a gas charged with solid particles and/or vapors, which comprises passing the gas stream through a conditioning tower, spray-injecting therein water into the gas to form fine droplets which are allowed to completely evaporate out of contact with the wall, and discharging the cooled and wetted gas from the conditioning tower. According to the invention, the water is sprayed with known per se nozzles which at a reduced water supply give a droplet size less than, or equal to, that at a larger water supply, and the supply of which is variable over a wide range, and the water supply is controlled so that, upon modification of the inlet temperature $T_1$ and/or the amount of gas, on the one hand, the water supplied is completely evaporated within the conditioning tower and, on the other hand, the outlet temperature $T_2$ of the gas always remains above the known dew point line of the gas.

6 Claims, 1 Drawing Figure

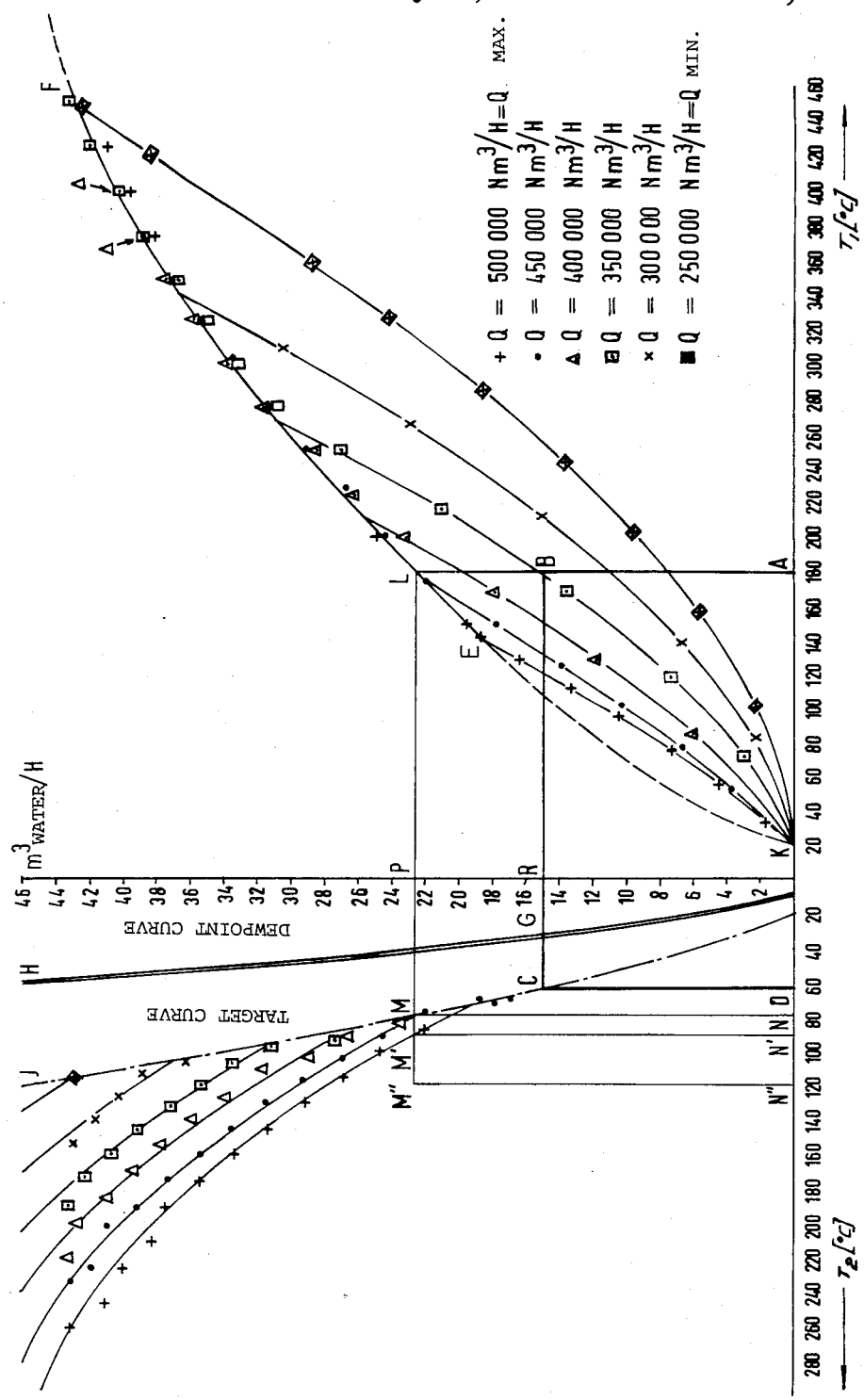

PROCESS FOR CONDITIONING A GAS STREAM CHARGED WITH SOLID PARTICLES AND/OR VAPORS

This is a continuation of application Ser. No. 664,023, filed Oct. 23, 1984 (abandoned), which was a continuation of application Ser. No. 526,281 filed Aug. 25, 1983 (abandoned).

The invention relates to a process for conditioning a gas stream charged with solid particles and/or vapours, which comprises passing the gas stream through a conditioning tower, spray-injecting therein water into the gas to form fine droplets, allowing these droplets to completely evaporate out of contact with the walls, and discharging the cooled and wetted gas from the conditioning tower.

In many technical processes a lot of dust is released. It is required, in some cases for environmental reasons and in other cases because the dust is a valuable material, to separate this dust from the gas.

Examples thereof are steel mills where in the process of blowing a melt or casting molten steel considerable amounts of metallic oxides are released in the form of a cloud of dust. Owing to the high temperature of the melt this dust is additionally suspended in very hot air.

In the cement industry, too, large amounts of dust are sometimes released, e.g., in the dry milling of the starting material for the cement kilns and in the flue gases from these kilns themselves.

In flue gases formed in the combustion of sulphur-containing fuels $SO_2$ occurs, often together with water vapour. Although the amount of $SO_2$ does not always render its recovery profitable, yet it is often advisable for environmental reasons to separate this $SO_2$. Furthermore, in the simultaneous presence of $SO_2$ and water vapour the "acid dew point", i.e. the highest temperature at which an acid condensate may be formed is then much higher than the temperature which would be expected in view of the water vapour content alone. Such acid dew points not seldom amount to 130° C. in flue gases. In technical processes in which a high $SO_2$ content is aimed at, this acid dew point may even rise to 300° C.

Also in the combustion of domestic wastes flue gases are formed which contain not only water vapour, $CO_2$ and $SO_2$, but also often HCl formed in the combustion of, e.g., PVC. In this case too the "acid dew point" may become very high. Attempts are sometimes made to bind such HCl vapours by spray-injecting into the gases a solution of, e.g., $Ca(OH)_2$, from which the water is then evaporated and $CaCl_2$ formed is carried along as solid particles.

It is apparent from these examples that the temperature of the treated gas is often very high, and in some cases the "dew point" may likewise be high.

Because these gases are always passed to the final separation zone (e.g., a bag filter, an electrostatic filter or another purifier) through a conduit, it is necessary that no liquid particles should be carried along with this gas stream and that this gas stream should always remain above its dew point.

Such liquid particles or condensate formed would deposit on the inner wall of the conduit and corrode same. Even if this corrosion is avoidable, such liquid may capture dust particles and adhere same to the inner wall of the conduit, so that this conduit clogs gradually and must therefore be cleaned regularly, which often requires shutdowns.

The majority of processing equipment is only useful for treating gases within a limited temperature range. For instance, bag filters are only useful at temperatures to which the filter material employed is resistant, i.e., normally below about 180° C. When electrostatic filters are used, the gases must be cooled to the temperature at which these filters have optimum activity, because otherwise the filter volume required becomes too large. The fact is that the dust particles deposited must have as high an electric conductivity as possible and this varies with the temperature. Preferably, this temperature does not exceed 90°-120° C. Depending on the origin of the gases the content of and the nature of, the solid particles and the vapours will vary strongly. The temperature and the gas volume supplied per unit of time will also very strongly. Furthermore, again depending on the origin of the gases, each of these magnitudes itself may vary strongly and, in particular, show very high peaks. For instance, when the gases are discharged from a steel converter, the volume of the gases may attain a peak of, e.g., 450,000 $Nm^3$/hr at a temperature of about 300° C., while after that peak the volume may fall to below 50,000 $Nm^3$/hr at about 150° C.

It had already been known to atomize water in a conditioning tower provided with a plurality of nozzles. These nozzles must form fine droplets of substantially equal size. Because the amount of water supplied will further vary with the amount of gas supplied and the temperature thereof, the nozzles must preferably also be capable of continuously forming these fine droplets of substantially equal size when the water supply is reduced.

Very effective for this purpose are known per se nozzle types in which a liquid is atomized under the influence of a gaseous medium supplied separately, such as compressed air. An example thereof are the "Sonic" nozzles, in which the water to be atomized is injected into a resonant cavity driven by compressed air, finely divided therein and then blown away. When the water supply is reduced, the size of the droplets even diminishes.

In the device known for this purpose the amount of water supplied was controlled by continuously measuring the outlet temperature (and sometimes the inlet temperature) and controlling the amount of water so that the outlet temperature remained constant at a selected value above the highest dew point to be expected.

While these known devices were satisfactory in cases in which the inlet temperature and the amount of the gas supplied varied little only, it turned out that difficulties were encountered when considerable peaks occurred in the amount or the temperature of the gas, even if only for a short time. In fact, the time available for evaporating the droplets is equal to the residence time of the gas in the conditioning tower, and this time therefore decreases, as the gas supply increases. For at a doubled gas supply and at equal temperature the amount of water would have to be doubled too, and that amount of water would have to evaporate in only half the time. Unless a very big tower is used, this will not be successful, and the discharge conduits will then become fouled as a result of droplets carried along which deposit and catch dust on the walls.

At a peak in the inlet temperature the water supply would likewise have to be increased. In this case the available evaporation time would remain constant and therefore often become too short, unless a bigger tower is used. Moreover, it will become very possible in this case that the set target temperature cannot be reached at all, because the dew point is reached earlier than the desired temperature, so that no more water evaporates. In that case the control apparatus will always supply more water, which, however, cannot evaporate either. Then the equipment is seriously fouled.

In the case of irregularities in the temperature and/or supply volume it is therefore necessary for a proper operation that two conditions be satisfied: firstly, all the droplets atomized should actually have been completely evaporated before they leave the conditioning tower, and secondly, the water content of the gas should never become so high that the dew point is reached.

When this known process is used, these difficulties can only be avoided by applying a very big conditioning tower. This, however, considerably increases the installation cost, and moreover a suitable place is often not to be found for such a big tower. Even the use of a very big tower, however, cannot avoid that the dew point is reached or exceeded.

Many of these known installations were furthermore provided with nozzles forming droplets larger at a partial load than at full load. When the gas supply and accordingly the water supply were reduced, it often appeared that these larger droplets could not be evaporated completely before they had reached the bottom of the conditioning tower. In that case a sludge was formed at the bottom of that tower, which resulted in fouling and often corrosion.

According to the invention the water is atomized with known per se nozzles which at a reduced water supply produce droplets of maximally the same size as at an increased water supply, the inlet temperature $T_1$ of the gas further being continuously measured, and the amount of water to be maximally evaporated and the minimum outlet temperature $T_m$ to be reached being calculated therefrom and from the known structural date of the conditioning tower, comparing this last temperature with the end temperature $T_2$ measured, and increasing or reducing the water supply to suit the requirements.

According to a preferred embodiment of the invention, in addition the volume of the gas supplied is measured, which enables a more accurate calculation of the minimum outlet temperature $T_m$ to be reached. The result is that the water supply can be adjusted to the changes in the supply more rapidly.

Because according to the invention the target value for the outlet temperature is not constant, but dependent on the supply, it now becomes possible to also meet temperature peaks in a simple manner without reaching the dew point in the gas discharged: in that case the gas is simply cooled to a somewhat lesser extent, but yet the maximum amount of atomized water is used that can still be evaporated within the conditioning tower at the given gas supply. Likewise, a peak in the volume of the gas supply can be simply met by increasing the target value for the outlet temperature. From an economic point of view it is highly important that this result should be obtained without installing a bigger conditioning tower.

In practice, not only the supply volume and the inlet temperature, but also the content of water vapour, $SO_2$, HCl and solid particles in the gas stream supplied will of course vary, and accordingly the "acid dew point" of the gas discharged will also vary. Consequently, a safe value is to be selected for the "assumed dew point".

The aforementioned nozzles, in which the water is atomized under the influence of a gas supplied separately under pressure, prove to be very effective for the process according to the invention, particularly the nozzles having a resonant cavity. Nozzles of this last type are known, inter alia, from U.S. Pat. Nos. 3,230,923, 3,230,924, 3,240,253, 3,240,254 and 3,371,869.

For a given conditioning tower with given nozzles the required evaporation time of the droplets and the available evaporation time can be calculated from the size of the droplets, from the amount of gas supplied, the temperature and the moisture content thereof. In order to optimally increase the available evaporation time, the gas will preferably be passed through the conditioning tower from the bottom to the top, so that the droplets fall countercurrently to the gas stream.

It is then also possible to calculate from the composition of the gas and the amount of water supplied the dew point reached, as well as the end temperature reached and consequently also the maximum amount of water allowable to remain above this dew point. By effecting this calculation for a series of gas volumes supplied and a series of temperatures and by then combining the resulting values in a Table or nomogram one can subsequently derive from this Table or this nomogram for each amount of gas supplied and each inlet temperature:

(a) to what extent the gas can be cooled with complete evaporation of the water in the conditioning vessel employed, and (b) what amount of water is required therefor.

Such a nomogram is illustrated in FIG. 1.

This nomogram relates to a cylindrical conditioning tower having a diameter of 7 m, a height of 30 m and an evaporation volume of about 1150 $m^3$. Gases to be cooled and loaded with dust are passed through this vessel from the bottom to the top, and at the bottom of the cylinder there are 8 nozzles with which water can be atomized under the influence of compressed air. The total capacity is 40 $m^3$ water per hour.

The right-hand side of this Figure shows a number of curves reaching from point K to line KEF. Each curve relates to a given amount of gas supplied and indicates (on the vertical axis) at a number of inlet temperatures the amount of water required for bringing the outlet temperature to the target curve which in the present case is represented by line CJ. At the top the curves extending from K are limited by line KEF. Above the line KEF the injected water will not be evaporated in the given device. When the gas flow rate and temperature exceed the intersection of the corresponding flow rate curve with KEF, the water injection, as limited by line KEF, is not sufficient for reaching the target curve CJ. In that case the gas cannot be cooled further than is indicated by the corresponding curve, on the left of line CJ.

In the nomogram line GH represents the dew point curve of the gas, and curve JC has in the present case been selected so that each target temperature, expressed in °C, is twice as high as the dew point, likewise expressed in °C. The latter, however, is only an example. For the invention it suffices that curve CJ is on the left of line GH.

The maximum water flow as represented by line KEF, increases with increasing inlet temperature. The target temperature values, as represented by the line CJ, increase with increasing water flow values, For obtaining a safe target temperature $T_s$ to be reached with certainty from the measured inlet temperature $T_1$, using the known structural data of the conditioning tower and of the known dew point data of the gas supplied, the following insight is necessary:

In the nomogram line K— —EF indicates the limit imposed by the construction and the sizes of the conditioning tower, the process conditions of the gas and the nozzles employed. Accordingly, this line corresponds to all that is to be taken into account in view of the specifications. The area on the left above of line K— —EF is no longer to be used with complete evaporation of all the droplets, and accordingly no more water should be supplied than corresponds to a point on this line K— —EF. It is allowed, however, to supply less water, so that the operating point then lies at the right below line K— —EF.

From point K to several points of line EF a plurality of parameter curves have been drawn which, each for a constant amount of gas flow, show the relationship between the inlet temperature $T_1$ and the amount of water which must be atomized to obtain a temperature lying on the target curve CJ.

Each intersection of such a parameter curve with line KEF therefore indicates the extreme inlet temperature $T_1$, at which a temperature at the target curve can just still be reached with complete evaporation of the atomized water.

The parameter curves in the nomogram only serve as an example. They have been derived from specifications, in which the maximum amount of gas was 500,000 Nm$^3$/ hr and the minimum amount of gas was 250,000 Nm$^3$/ hr. It will be clear to a skilled worker that an analogous nomogram can be drawn for any other case, in which the necessary structural data and operating conditions are known.

Therefore, in the illustrated case the leftmost curve K+ + +EF indicates the limit corresponding with the maximum gas supply and the rightmost curve KF with the minimum gas supply. It will be clear that the curve KEF does not end at F, but can be drawn further to suit to the requirements when such inlet temperatures may occur.

It turns out that the calculation of a safe target temperature to be reached with certainty is possible, even without knowing the amount of the gas supply. In that case it is supposed that the gas supply is the maximum gas supply.

In order to derive in that case the target temperature $T_s$ from the measured value of inlet temperature $T_1$, a vertical line is drawn from the measured value of $T_1$ (e.g., point A), until it intersects the curve K+ +EF. From the intersection found (in the Example L) a horizontal line is then drawn to intersect the vertical axis in point P and line CJ in point M. From M a vertical line MN is then drawn, point N indicating the target temperature $T_s$.

Through point L the parameter curve is also drawn, e.g., K . . . L, which intersects curve EF in L. To the thus found parameter curve K . . . L belongs a value of Q, which is further designated as $Q_o$. This $Q_o$ is the highest value of Q, at which the target temperature $T_s$ can still be reached.

This temperature T therefore corresponds with a gas supply of $Q_o$=450,000 Nm$^3$ per hour or less. The point P gives the maximum water supply associated to this gas supply, and this value P is supplied to the controlling means as maximum value. At the same time the value of $T_s$ is supplied as a target value to the automatic controlling means for the water supply. This controlling means compares $T_s$ with the measured outlet temperature $T_2$ and then modifies the amount of water supplied in the known manner to suit the requirements.

If the actual gas supply Q is indeed equal to $Q_o$=450,000 Nm$^3$/ hr, then the amount of water to be supplied will substantially correspond to the value at point P.

If the gas supply Q is less than $Q_o$=450,000 Nm$^3$/hr, and e.g., equal to Q=350,000 Nm$^3$/ hr, then the automatic controlling means will reduce the amount of water to a degree sufficient to keep the outlet temperature $T_2$ practically equal to $T_s$ (point N). Consequently, the amount of water then becomes proportional to the gas supply (at equal $T_1$). The amount adjusted by the controlling means then becomes P x Q/$Q_o$, but always maximally equal to P.

If the gas supply Q exceeds 450,000 Nm$^3$/ hr, e.g. equals the maximum Q max (500,000 Nm$^3$/ hr) assumed in the specifications, then it will no longer be possible to cool the gas safely (i.e., with complete evaporation of all the droplets) to the desired value N (for then the maximum value P would be exceeded). In that case, the gas can only be cooled to a temperature corresponding to line M'N', which is higher than corresponds with point N. Yet, in this case too, a very useful cooling is obtained and the wetting of the wall of the conditioning tower and of the gas conduits is avoided with certainty.

At a still larger gas supply Q only point M will shift farther to the left, e.g., to M". The conditioning tower and the gas conduits are then still prevented from being fouled by giving the water supply controlling means a limit value corresponding to point P, which limit value cannot be exceeded.

According to a preferred embodiment not only $T_1$ and $T_2$, but also the gas supply Q are measured (in Nm$^3$/hr). In that case it is no longer necessary to start the calculation from the maximum gas supply $Q_{max}$, but the actual operating point can be immediately determined (in the Example, point B). Again a horizontal line BC is drawn to intersect the vertical axis in point R. The water supply associated with R is again supplied to the controlling means as limit value, and the temperature $T_s$ belonging to the vertical line CD is supplied to that controlling means as the target temperature. From the FIGURE it immediately follows that in this case a lower limit value R and a lower temperature $T_2$ are obtained. The amount of water supplied (at an equal gas supply Q and equal $T_1$) is larger than in the case first discussed, for that amount is:

$$R = A - D/A - N \times P \times Q/Q_o.$$

According to this preferred embodiment the conditioning tower is therefore utilized more completely.

According to another preferred embodiment the actual value of the humidity of the gas or the actual value of the dew point in the supplied gas is measured simultaneously with $T_1$ and $T_2$ and, if required, Q. This is very useful when this dew point shows considerable fluctuations, because then the amount of water to be maximally evaporated will of course also change. When that value of the water content is known, a correction can be made to the value of P, or R, which has been found in the above manner.

In the above embodiments of the invention use is only made of the specific requirements imposed upon the conditioning vessel in the specifications. Other special embodiments, in which, e.g., the emission of contaminations (in parts by weight per $Nm^3$ gas) is kept constant, are generally only possible if the processes within the conditioning vessel are also well known.

It will have to be decided for each individual case whether the above additional steps are profitable and justifiable.

It is also possible to connect several conditioning vessels in series. In that case each of the conditioning vessels will have to be provided with an arrangement as described before, so that the vessels together give the desired result. Such a method is of course more complicated, but in some cases it may be the only solution, especially if owing to lack of accommodation the vertical dimensions of the conditioning vessels must be restricted.

The calculation of the desired temperature $T_s$ and of the limit value (R or P) for the water supply and the comparison of the measured value of $T_2$ with $T_s$ and the adjustment of the amount of water supplied can most effectively be accomplished with an electronic controlling means, which is designed according to known principles for reading off $T_1$ and $T_2$ and, if required, Q continuously or at short intervals and for carrying out the above calculations. This controlling means may operate either by digital or analogue principles. Once the task of that device is known, its construction will be clear to a skilled worker.

The gist of the invention lies in the insight in the principles, according to which the amount of water supplied is to be controlled in order to prevent the walls of the conditioning vessel and the gas conduit from being wetted and at the same time to avoid fouling of these parts with certainty, with optimum utility of the conditioning vessels at any time.

We claim:

1. A process for conditioning a gas charged with solid particles, comprising the steps of
   passing the gas through a conditioning tower which receives the gas through a tower inlet and discharges the gas through a tower outlet;
   spray injecting water into the gas in the conditioning tower by means of nozzles so that the injected water is evaporated in the tower without contact with walls of the tower; said nozzles being such that, at reduced water flows, smaller droplets are produced than are produced at greater water flows;
   measuring the temperature of the gas passing through the tower inlet;
   calculating, during operation and as a function which varies in a predetermined manner in accordance with the measured inlet temperature, a maximum water flow value equal to or less than the maximum water flow which can be completely evaporated within the conditioning tower at a predetermined gas flow without any non-evaporated droplets reached the tower outlet;
   further calculating during operation a target outlet temperature which is greater than the dewpoint temperature and which is a function varying in predetermined manner in accordance with the calculated maximum water flow value and based upon constructional data for the conditioning tower;
   measuring the temperature of the gas passing through the power outlet: and
   controlling the water flow to the nozzles to be less than or equal to the lesser of (1) the calculated maximum water flow value, and (2) a water flow which results in the measured outlet temperature being equal to the target outlet temperature.

2. A process as claimed in claim 1 further including measuring the gas flow through the conditioning tower; and wherein the calculating of a maximum water flow value includes utilizing the measured gas flow as the predetermined gas flow.

3. A process as claimed in claim 1 further including measuring the water content of the gas passing through the tower inlet, and adjusting the calculated maximum water flow value in correspondence with the measured water content.

4. A process as claimed in claim 1 wherein the predetermined gas flow is a maximum gas flow determined from constructional data for the conditioning tower.

5. A process as claimed in claim 4 further including measuring the water content of the gas passing through the tower inlet. and adjusting the calculated maximum water flow value in correspondence with the measured water content.

6. A process as claimed in claim 1 wherein the calculating of a maximum water flow value includes utilizing a function wherein increases in inlet temperature produce corresponding higher water flow values, and tne calculating of a target outlet temperature includes utilizng a calculating function wherein larger calculated maximum water flow values produce corresponding higher target outlet temperatures.

* * * * *